United States Patent [19]

Kruse et al.

[11] Patent Number: 4,726,908
[45] Date of Patent: Feb. 23, 1988

[54] AGGLOMERATION PROCESS INCLUDING A HEATING STEP FOR MAKING A FREE-FLOWING GRANULATE

[75] Inventors: Hans Kruse, Korschenbroich; Franz-Josef Carduck, Haan; Jochen Jacobs, Wuppertal; Klaus Koester, Langenfeld; Rolf Puchta, Haan; Heinz-Manfred Wilsberg, Cologne, all of Fed. Rep. of Germany

[73] Assignee: Henkel Kommanditgesellschaft auf Aktien, Duesseldorf, Fed. Rep. of Germany

[21] Appl. No.: 828,409

[22] Filed: Feb. 11, 1986

[30] Foreign Application Priority Data

Feb. 11, 1985 [DE] Fed. Rep. of Germany ....... 3504628

[51] Int. Cl.$^4$ ............................ B01J 2/00; B01J 2/14; B05D 1/02; C11D 11/00
[52] U.S. Cl. ..................................... 252/91; 23/313 R; 23/313 AS; 23/313 FB; 23/313 P; 252/99; 252/102; 252/155; 252/174; 252/174.13; 252/174.15; 252/174.21; 252/174.25; 252/186.31; 252/186.38; 252/8.8; 264/117; 264/121; 264/122; 264/123; 427/213; 427/214; 427/220
[58] Field of Search ........ 23/313 R, 313 AS, 313 FB, 23/313 P; 264/117, 121, 122, 123; 252/99, 91, 102, 155, 174, 174.13, 174.15, 174.21, 174.25, 186.31, 186.38; 427/213, 214, 220

[56] References Cited

U.S. PATENT DOCUMENTS

| | | | |
|---|---|---|---|
| 3,387,923 | 6/1968 | Shen | 23/106 |
| 3,687,640 | 8/1972 | Sams | 23/313 |
| 3,711,254 | 1/1973 | McGowan | 23/313 |
| 3,773,678 | 11/1973 | Munday | 252/186 |
| 3,868,227 | 2/1975 | Gericke | 23/313 |
| 3,932,140 | 1/1976 | Jayawant | 264/117 |
| 4,002,434 | 1/1977 | Simmersbach | 23/313 R |
| 4,136,051 | 1/1979 | Saran | 252/91 |
| 4,372,868 | 2/1983 | Saran | 252/102 |
| 4,427,417 | 1/1984 | Porasik | 23/313 R |

FOREIGN PATENT DOCUMENTS 0006655  1/1980  European Pat. Off. ............ 252/102

*Primary Examiner*—Dennis Albrecht
*Attorney, Agent, or Firm*—Ernest G. Szoke; Henry E. Millson, Jr.

[57] ABSTRACT

A free-flowing granulate of a powder-form or fine-grained component and a liquid component; the granulate containing at least 20% by weight of the liquid component, is prepared by moving the powder-form or fine-grained component in a mixer-granulator, adding the liquid component while mixing until a moist granulate having a particle size of at most 1.5 mm is obtained, subsequently coarsening the granulate thus obtained with an increase in temperature to a particle size of from 0.4 to 4 mm and optionally coating this coarse granulate with another powder-form and/or fine-grained component at 60° to 90° C. The optionally coated granulate is converted by lowering the treatment temperature into a dry-looking, free-flowing, coarse-grained product, which if desired, may be coated with another powder-form and/or fine-grained material. Despite the high percentage of a liquid component, the granulate thus obtained appears as a dry granulate and is free-flowing.

13 Claims, No Drawings

AGGLOMERATION PROCESS INCLUDING A HEATING STEP FOR MAKING A FREE-FLOWING GRANULATE

BACKGROUND OF THE INVENTION

1. Field of the Invention

The present invention relates to a process for the preparation of a free-flowing granulate consisting of a powder-form or fine-grained component and a liquid component, the granulate containing at least 20% by weight of the liquid component.

2. Description of Related Art

The use of coarse-grained material instead of finely divided powder-form material has a number of advantages in terms of handling. Because of this, many powder-form materials are converted into coarse-grained materials, for example into granulates, with liquid in addition to powder-form auxiliaries frequently being used as binders. If the auxiliaries are inert, the content of binders in the granulate should be kept as small as possible. In many cases, however, finely divided and liquid active materials have to be converted into a granular, free-flowing product which feels dry. In this connection, it is often desirable to be able to produce granular products containing a relatively high percentage of liquid constituents. Unfortunatley, the incorporation of relatively large quantities of liquid constituents generally leads to moist products with poor flow properties.

DESCRIPTION OF THE INVENTION

Other than in the operating examples, or where otherwise indicated, all numbers expressing quantities of ingredients or reaction conditions used herein are to be understood as modified in all instances by the term "about."

The process of the present invention is carried out using the following steps:
(a) moving the powder-form or fine-grained component, preferably by stirring or mixing in a mixer-granulator,
(b) adding the liquid component to the moving powder-form or fine-grained component,
(c) mixing the powder-form or fine grained component and the liquid component until a moist granulate having a particle size of at most 1.5 mm is obtained,
(d) heating the granulate from step (c) to a product-specific temperature in a grain-coarsening unit until a coarse-grained moist granulate having a particle size of from 0.4 mm to 4.0 mm is obtained,
(e) optionally mixing the granulate from step (d) with at least one other powder-form and/or fine-grained material or with a mixture of a powder-form component and a liquid component at the product-specific temperature, wherein the granulate becomes coated therewith in the process,
(f) lowering the temperature by a few degrees with continuous movement until a dry-looking, free-flowing coarse-grained product is obtained, and
(g) optionally subjecting at least part of the product from step (f) to steps (e) and (f).

In the context of the invention, a free-flowing granulate is understood to be a coarse-grained product which is obtained from a powder-form component and a liquid component by agglomeration of the powder-form particles. The free-flowing product can be poured out from a container in the same way as a liquid. In addition, the constituent particles of the free-flowing product do not clump together, i.e. do not form relatively coarse agglomerates. The powder-form component from process step (a) consists of particulate solids having a particle size ranging from the fineness of dust to 0.05 mm. The expression "particle size of 0.05 mm" means that the largest particle has a diameter of 0.05 mm. Unless otherwise stated, the expressions "particle size" or "grain size" used in the following should be interpreted in the same way. The "product-specific temperature" is the temperature or the narrow temperature range at which grain coarsening takes place to form a moist, coarse-grained granulate with poor flow properties. It is dependent on the type and quantity of the granulate constituents and, in many cases, is in the range of from 60° to 90° C. The product-specific temperature may readily be determined by routine tests. The expression "liquid" is to be interpreted as substances which are liquid at room temperature and substances which are liquefied by dissolution in water or organic solvents or by heating; and also free-flowing dispersions of emulsions. A "component" is to be understood to mean a homogeneous substance, or a liquid or powder-form mixture consisting of more than one substance. A "mixer-granulator" is understood to be a mixing vessel in which the material to be mixed is moved by moving mixing elements, optionally in combination with fixtures, or by injection of gases, including a granulation disc. The expression "fine-grained" means a particle size in the range of from 0.1 to 1 mm, while the expression "coarse-grained" means that at least 50% by weight of the product consists of particles having a grain size of from 0.4 to 4 mm. A "grain-coarsening unit" in the context of the invention is again a mixer-granulator, the only difference being that the expression "grain-coarsening unit" is intended to signify that further components do not necessarily always have to be mixed with the fine-grained material from process step (c) in this unit. The expression "moist granulate" in the context of process steps (c) and (d) means that at least part of the granulate clumps together to form relatively coarse agglomerates and, in that state, does not resemble a liquid in its flow behavior. "Coating" is understood to mean that the granulate formed in the grain-coarsening unit becomes at least partly covered over its surface by a powder-form or fine-grained substance or mixture of substances. The expression "lowering the temperature by a few degrees" means that the granulate is cooled to such an extent that the moist, coarse-grained granulate with poor flow properties obtained at the product-specific temperature in the grain-coarsening unit is surprisingly converted into a dry-looking, free-flowing coarse-grained granulate with liquid-like flow behavior. The reduction in temperature required for this purpose is of the order of 5° to 10° C., depending on the product-specific temperature at which grain coarsening takes place and also on the composition of the granulate.

In one preferred embodiment, process steps (a) to (c) are carried out in a mixer-granulator at a temperature of the material being mixed which is at least as high as, but no more than 20° C. higher than, the solidification temperature of the liquid component, mixing being effected by moving mixing elements, optionally in combination with rigid fixtures. A characteristic example of a mixer-granulator of the type in question is the ploughshare mixer-granulator made by Messrs. Loedige of Paderborn, Federal Republic of Germany. Process steps (d) to (g) may also be carried out in a mixer-granulator of this type or even in other types of mixer-granulator with moving mixing elements. However, the product from process steps (a) to (c) is advantageously transferred to a grain-coarsening unit in which the grain-coarsening process is carried out in a fluidized bed. A typical example of a suitable grain-coarsening unit is the fluidized-bed granulator made by Messrs. Glatt, Federal Republic of Germany. The temperatures for steps (d) to (g), which are so important to the process of the invention, may readily be adjusted and varied by blowing in heated air or other heated gases. If desired, part of the product from process step (f), i.e. for example separated granulate having a particle size below 0.4 mm or a separated granulate having a particle size above 4 mm which was subsequently size-reduced to particle sizes below 4 mm, or granulate which it is desired to repeatedly coat, is recycled to process steps (e) and (f).

The process of the invention is particularly suitable for the production of detergents or of preliminary or intermediate products for detergents or washing auxiliaries or washing or fabric treatment preparations. If the process of the invention used for making products such as these, constituents of detergents or washing auxiliaries or washing or fabric treatment preparations are used as the powder-form or fine-grained and liquid components. In addition, it is possible to use powder-form or liquid auxiliaries, such as for example carriers or binders; these auxiliaries may be both constituents of detergents and also substances which are foreign to detergent formulations. One example of a product which may be made with particular advantage by the process of the invention is a granular washing aid which may be added to the wash liquor to obtain particularly good washing results in the presence of heavy or difficult stains. The powder-form or fine-grained component used in this product may be one or more of the following substances; highly disperse silica, fillers, disintegrating agents, bleach activators, per compounds, fabric softeners, quaternary ammonium compounds containing one or two long residues, soluble and insoluble builder salts, clays, heavy metal complexing agents, redeposition inhibitors, discoloration inhibitors, enzymes, optical brighteners, foam regulators, dyes, powder-form washing-active substances. The liquid component used may be one or more of the following substances: liquid or liquefied or dissolved or dispersed washing-active substances, foam regulators, builder salts, heavy metal complexing agents, perfumes, water, organic solvents, waxes, oils. The powder-form or fine-grained components used are, in particular, highly disperse precipitated silica, sodium aluminium silicate, sodium perborate, tetraacetylethylene diamine, $C_8$–$C_{20}$ alkyltrimethylammonium salts, either individually or in combination with one another. Substances which are particularly suitable and therefore preferred as the liquid component are nonionic surfactants, particularly of the alcohol ethoxylate type, nitrogen-containing compounds such as adducts of from 1 to 6 moles of ethylene oxide with 1 mole of a primary fatty amine containing a long-chain $C_{10}$–$C_{16}$ alkyl or alkenyl group, the sodium salt of β-aminoalkyl or β-aminoalkenyl propionic acid, silicone oil, solutions of heavy metal complexing agents, either individually or in combination with one another.

As will be shown hereinafter, the liquid component present on the surface protects the underlying constituents against undesirable outside influences. This surprising observation may be utilized with particular advantage by combining substances which are poorly compatible or incompatible with one another to form granulate grains in such a way that they are separated from one another by this protective layer of the liquid component and are therefore unable to react with one another. If it is desired to use this valuable feature of the process of the invention, the granulate from process step (d) or (f) is completely or partly coated with at least one other powder-form or fine-grained material or with a mixture of a powder-form component and a liquid component at the product-specific temperature. Through this measure, it is possible to simultaneously accommodate per compounds and activators for per compounds in one granulate grain without these components reacting with one another and hence losing significant amounts of activity in the event of prolonged storage. In any event, any loss of activity during storage is considerably reduced by application of the process of the invention. In one preferred embodiment of the process of the invention, therefore, the granulate containing activators for per compounds from process step (d) is coated in process step (e) with a premix or fine-grained granulate of sodium perborate, more particularly of sodium perborate monohydrate and alcohol ethoxylate, more especially $C_{14}$–$C_{15}$ oxoalcohol with 7 moles of ethylene oxide, the premix or the granulate of sodium perborate monohydrate and the oxoalcohol ethoxylate preferably being present in a ratio by weight of (6–7) to (4–3).

It is also possible by the process of the invention to apply an inert covering material to afford even greater protection to the component lying inside the granulate grains against any active components applied externally to the granulate grains. In one preferred embodiment of the process of the invention, process step (e) is carried out by contacting the granulate with a first, generally inert covering material and then with a second covering material; the first covering material being selected in such a way that it is compatible both with the product of process steps (a) to (d) and with the second covering material, i.e. for example a premix or granulate of sodium perborate and alcohol ethoxyate. A procedure such as this is therefore preferred.

A washing aid having particularly valuable properties is obtained by the process of the invention if
(a) from 5 to 55 parts by weight of highly disperse precipitated silica or sodium aluminosilicate, from 3 to 20 parts by weight of tetradecyltrimethylammonium salt,
from 1 to 5 parts by weight of a premix of 4 parts by weight of polydimethylsiloxane and 6 parts by weight of highly disperse precipitated silica and, optionally, from 10 to 40 parts by weight of tetraacetyl ethylene diamine are mixed with circular movement,
(b) from 15 to 45 parts by weight of alcohol ethoxylate and
from 1 to 10 parts by weight of a 10 to 40% by weight aqueous solution of a heavy metal complexing agent are sprayed successively or simultaneously onto the mixing mixture,
(c) the mixture from process step (b) is moved for 10 to 60 seconds to form a moist granulate,
(d) the product from process step (c) is transferred to a fluidized-bed granulator and heated with hot air in a fluidized bed to 60°–90° C. with coarsening of the grain,
(e) a coating of a compatible material, more especially a granulate of sodium perborate and alcohol ethoxylate, is optionally applied at 60° to 90° C., and (f) the temperature in the fluidized bed is lowered by 5° to 10° C. to form a dry, free-flowing, coarse-grained granulate.

In addition to the production of washing aids, the process of the invention may of course also be used for the production of other granulates containing at least 20% by weight of a liquid component. The process of the invention can always be applied in the cases where liquid and finely divided materials are to be processed into free-flowing granulates in the sense of the present invention, i.e. for example for fertilizers, pesticides, pigments, enzymes, medicaments, foods and semi-luxuries such as, for example, baking mixes or granulates for soups or instant beverages. Despite their high content of a liquid component, the products obtained by the process according to the invention are distinguished by satisfactory flow properties and, hence, by good handling properties. These properties remain largely unchanged, even in the event of prolonged storage. If delicate raw materials are processed by the process of the invention, their properties remain unchanged for longer periods than would be the case if the granulates were to be produced without using the process of the invention.

The invention will be illustrated by the following examples, which are given for that purpose only.

EXAMPLES

The following Examples illustrate the production in accordance with the invention of granulates containing detergent constituents. In some cases, granulates such as these are added to the wash liquor to obtain particularly good washing results in the presence of heavy or difficult stains. However, this does not in any way confine the invention to the production of granulates containing detergent constituents.

Example 1

In a 130 liter capacity ploughshare mixer made by Messrs. Loedige, Federal Republic of Germany, 4.65 kg of precipitated silica, 9.23 kg of tetraacetylethylene diamine, 3.39 kg of tetradecyltrimethylammonium bromide, 1.11 kg of a mixture of 40% by weight of polydimethylsiloxane and 60% by weight of precipitated silica were mixed at room temperature and then sprayed for 2 minutes with a mixture of 9.23 kg of liquid $C_{14}$–$C_{15}$ oxoalcohol +7 moles ethylene oxide and 2.31 kg of a 33% by weight aqueous solution of the hexasodium salt of ethylene diamine tetramethylene phosphonic acid. After mixing for 30 seconds with choppers, a moist, non-free-flowing granulate having a particle size of up to 1 mm was formed. This granulate was transferred to a fluidized-bed granulator made by Messrs. Glatt, Federal Republic of Germany, and heated to 70° C. by blowing in heated air. This coarsened the granulate to a grain size of essentially 0.4 to 3 mm. The granulate remained moist and did not flow readily, although it could still be fluidized. The temperature of the granulate was then lowered to 65° C. Despite the presence of more than 30% by weight of liquid constituents, the granulate had a dry surface and was free-flowing. Separate fines (<0.4 mm) and size-reduced coarse fractions (>4 mm) could also be processed into dry, free-flowing granulate having a particle size of from 0.4 to 4 mm by heating to 70° C. and subsequent cooling to 65° C. in the fluidized bed.

If a heated granulation disc is used instead of the fluidized-bed granulator, comparable results are obtained.

Example 2

As in Example 1, 4.65 kg of precipitated silica, 9.23 kg of tetraacetyl ethylene diamine, 3.39 kg of tetradecyltrimethylammonium bromide and 1.11 kg of a mixture of 40% by weight of polydimethylsiloxane and 60% by weight of precipitated silica were mixed in a Loedige ploughshare mixer and then sprayed with a mixture of 9.23 kg of liquid $C_{14}$–$C_{15}$ oxoalcohol +7 moles ethylene oxide and 2.31 kg of a 33% by weight aqueous solution of the hexasodium salt of ethylene diamine tetramethylene phosphonic acid and rolled around until a fine-grained, moist granulate was formed. This granulate was fluidized in a fluidized-bed granulator at 70° C. until a granulate having a particle size of essentially 0.4 to 3 mm was formed. 3 parts by weight of a mixture of 65 parts by weight of sodium perborate monohydrate and 35 parts by weight of $C_{14}$–$C_{15}$ oxoalcohol +7 moles ethylene oxide were then added to 7 parts by weight of granulate and the contents of the granulator which were cooled by the addition were heated to 75° C. The sodium perborate premix was deposited on the granulate initially formed. After cooling to 70° C., a free-flowing granulate was obtained.

Example 3

This Example illustrates the high stability in storage of the product of Example 2 made by the process of the invention.

To this end, a mixture having the same composition as the end product of Example 2 was prepared as a comparison substance in a Loedige mixer at room temperature and stored for one week in cardboard boxes at 30° C./80% relative air humidity. Thereafter, the percentage retention of the tetraacetylethylenediamine (TAED) and the perborate in % was determined with the following results:

| Test Product | Retention % | |
| --- | --- | --- |
| | TAED | Perborate |
| Comparison substance | 62.3 | 66.0 |
| Granulate product in accordance with the invention | 79.9 | 82.4 |

After storage in moist air, the granulate produced by the process of the invention showed considerably higher activity both of the TAED serving as activator for the perborate and of the perborate itself. This favorable result of the granulate produced by the process of the invention would appear to be attributable to the liquid component, i.e., the oxoalcohol ethoxylate, present on the surface. In actual fact, it was found by secondary ion mass spectroscopy (SIMS) and by ion scattering spectroscopy (ISS) that the surface of the granulate is substantially covered with oxoalcohol ethoxylate which protects the granulate grain against moisture from outside the grain and greatly reduces a reaction between perborate and TAED.

Examples 4 and 5

Granulates having the following end product composition were produced in the same way as in Example 1:

| Composition | Example 4 | Example 5 |
|---|---|---|
| Precipitated silica | 11.4% | — |
| Polyacrylic acid, Na salt | — | 4% |
| Tallow alcohol +5 moles ethylene oxide | — | 1% |
| NaOH | — | 0.2% |
| Zeolite A | — | 30% |
| Sodium perborate monohydrate | 33.1 | — |
| Tetraacetylethylenediamine | — | 23% |
| Tetradecyltrimethylammoniumbromide | 12% | 7% |
| $C_{14}$–$C_{15}$ oxoalcohol +7 moles EO | 33.1% | 23% |
| Hexasodium salt of ethylenediaminetetramethylene phosphonic acid | 2.7% | 1.8% |
| Polydimethyl siloxane | 1.6% | 1% |
| Waterglass $SiO_2$: $Na_2O$ = 3.35:1 | — | 1% |
| Water | 5.9% | 8% |

These products also accumulated as dry, free-flowing granulates having high stability in storage in regard to the percentage retention of TAED and perborate.

What is claimed is:

1. A process for the production of a free-flowing granulate consisting of a powder-form or fine-grained dry component and a liquid component, wherein the granulate contains from about 20% to 30% by weight of the liquid component, comprising the steps of:
   (a) imparting movement to a first dry powder-form or fine-grained component, having a particle size up to about 1 mm; wherein said first dry component is a detergent, washing aid, or fabric treatment preparation;
   (b) adding a liquid component to the moving first dry component; wherein said liquid component is a detergent, washing aid, or fabric treatment preparation;
   (c) mixing the first dry component and the liquid until a substantially non-free-flowable moist granulate having a particle size of at most 1.5 mm is obtained;
   (d) heating the moist granulate from step (c) to a temperature of about 60° to 90° C. to aggomerate the moist granulate and form a coarse-grained moist, substantially non-free-flowable granulate having a particle size of from 0.4 mm to 4.0 mm;
   (e) optionally mixing the moist granulate from step (d) with a first material comprising a second powder-form or fine-grained dry component or a mixture of the second dry component and a liquid component at 60° to 90° C., m to obtain a granulate coated with said second dry component or mixture thereof;
   (f) lowering the temperature by from about 5° to 10° C. with continuous movement to obtain a dry-looking, free-flowing coarse-grained granulate product wherein at least 50% of the product has a particle size of from about 0.4 to 4 mm; and
   (g) optionally subjecting at least part of the granulate product from step (f) to steps (e) and (f).

2. A process in accordance with claim 1, wherein step (a) is carried out in a mixer-granulator.

3. A process in accordance with claim 1, wherein step (d) is carried out in a grain-coarsening unit.

4. A process in accordance with claim 1, wherein process steps (a) through (c) are carried out in a mixer-granulator in which mixing is effected by moving mixing elements.

5. A process in accordance with claim 1, wherein process steps (d) through (g) are carried out in fluidized-bed.

6. The process of claim 1, wherein the first dry component is highly disperse silica, a filler, a disintegrating agent, a bleach activator, a per compound, a fabric softener, a quaternary ammonium compound containing one or two long residues, a soluble or insoluble builder salt, a clay, a heavy metal complexing agent, a discoloration inhibitor, redeposition inhibitor, an enzyme, an optical brightener, a foam regulator, a dye, a powder-form washing-active substance, or a mixture thereof; and said liquid component is a liquid or liquefied or dissolved or dispersed washing-active substance, a foam regulator, a builder salt, a heavy metal complexing agent, a perfume, water, an organic solvent, a wax, or an oil.

7. A process in accordance with claim 6, wherein the liquid component is an alcohol ethoxylate.

8. A process in accordance with claim 1, wherein process step (e) is carried out with a mixture or fine-grained granulate of sodium perborate and alcohol ethoxylate.

9. A process in accordance with claim 8, wherein the alcohol ethoxylate is a $C_{14}$–$C_{15}$ oxoalcohol with 7 moles of ethylene oxide.

10. A process in accordance with claim 1, wherein process step (e) is carried out by first mixing the moist granulate from step (d) with the first material and then with a second material, the first material being selected in such a way that it is compatible both with the product of process steps (a) to (d) and with the second material.

11. The process of claim 1, including step (e).

12. The process of claim 1, wherein the first dry component is highly dispersed precipitated silica, sodium aluminum silicate, sodium perborate, tetraacetylethylene diamine, or a $C_8$–$C_{20}$-alkyl trimethylammonium salt or a mixture thereof; and said liquid component is a non-ionic surfactant, an adduct of from 1 to 6 moles ethylene oxide with one mole of a primary fatty amine containing a $C_{10}$–$C_{16}$-alkyl or alkenyl group, the sodium salt of β-aminoalkyl- or β-aminoalkenylpropionic acid, silicone oil, or a solution of a heavy metal complexing agent.

13. A process for the production of a free-flowing granulate consisting of a powder-form or fine-grained dry component and a liquid component, wherein the granulate contains at least 20% by weight of the liquid component, comprising the steps of:
   (a) imparting circular movement to a first dry powder-form or fine-grained component, having a particle size up to about 1 mm; said powder-form or fine-grained component comprising:
      from about 5 to about 55 parts by weight of highly disperse precipitated silica or sodium aluminosilicate;
      from about 3 to about 20 parts by weight of tetradecyltrimethylammonium salt;
      from about 1 to about 5 parts by weight of a premix of about 4 parts by weight of polydimethylsiloxane and about 6 parts by weight of highly disperse precipitated silica; and, optionally, from about 10 to about 40 parts by weight of tetraacetyl ethylene diamine;
   (b) spraying successively or simultaneously onto the moving mixture a liquid component comprising:
      from about 15 to 45 parts by weight alcohol ethoxylate; and from about 1 to 10 parts by weight of an about 10 to 40% by weight aqueous solution of a heavy metal complexing agent;
(c) mixing the first dry component and the liquid until a substantially non-free-flowable moist granulate having a particle size of at most 1.5 mm is obtained;
(d) heating the moist granulate from step (c) with hot air in a fluidized bed to about 60°–90° C. to agglomerate the first dry component particles and form a coarse-grained moist, substantially non-free-flowable granulate having a particle size of from 0.4 mm to 4.0 mm;
(e) optionally mixing the moist granulate from step (d) with a first material comprising a second powder-form or fine-grained dry component or a mixture of the second dry component and a liquid component at 60° to 90° C., to obtain a granulate coated with said second dry component or mixture thereof;
(f) lowering the temperature in the fluidized bed by from about 5° to 10° C. with continuous movement to obtain a dry-looking, free-flowing coarse-grained granulate product wherein at least 50% of the product has a particle size of from about 0.4 to 4 mm; and
(g) optionally subjecting at least part of the granulate product from step (f) to steps (e) and (f).

* * * * *